(12) United States Patent
Bushman et al.

(10) Patent No.: US 9,152,504 B1
(45) Date of Patent: Oct. 6, 2015

(54) STAGED RESTORE OF A DECREMENTAL BACKUP CHAIN

(71) Applicant: STORAGECRAFT TECHNOLOGY CORPORATION, Draper, UT (US)

(72) Inventors: Nathan S. Bushman, Pleasant Grove, UT (US); Douglas Mark Lee, Orem, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/501,795

(22) Filed: Sep. 30, 2014

(51) Int. Cl.
*G06F 12/00* (2006.01)
*G06F 11/14* (2006.01)

(52) U.S. Cl.
CPC ........ *G06F 11/1451* (2013.01); *G06F 11/1435* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| 2012/0078855 A1* | 3/2012 | Beatty et al. ................... 707/676 |
| 2013/0080397 A1* | 3/2013 | Payne et al. .................... 707/681 |

* cited by examiner

*Primary Examiner* — Baboucarr Faal
(74) *Attorney, Agent, or Firm* — Maschoff Brennan

(57) ABSTRACT

Staged restore of a decremental backup chain. In one example embodiment, a method includes, first, restoring a first backup of a source storage to a restore storage. Next, a second backup of the source storage in a decremental backup chain of the source storage is identified. Then, a third backup of the source storage in the decremental backup chain of the source storage is identified. Next, blocks in the decremental backup chain that were newly allocated in the source storage between the first point in time and the second point in time are identified. Then, the newly-allocated blocks are restored to the restore storage. Next, blocks in the decremental backup chain that were changed in the source storage between the first point in time and the second point in time are identified. Lastly, the changed blocks are restored to the restore storage.

20 Claims, 5 Drawing Sheets

FIG. 2A

STAGED RESTORE OF A DECREMENTAL BACKUP CHAIN

FIELD

The embodiments disclosed herein relate to a staged restore of a decremental backup chain.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and free blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since free blocks are not generally backed up.

Image backup can be relatively fast compared to file backup because reliance on the file system is minimized. An image backup can also be relatively fast compared to a file backup because seeking during image backup may be reduced. In particular, during image backup, blocks are generally read sequentially with relatively limited seeking. In contrast, during file backup, blocks that make up individual files may be scattered in the source storage, resulting in relatively extensive seeking.

Although image backup may be fast compared to file backup, creation of a base backup of source storage can take hours and possibly days to complete, depending on the size of the source storage. Further, repeatedly backing up an entire source storage may be unnecessary where most of the allocated blocks in the source storage do not frequently change.

One alternative to creating multiple base backups is to employ an incremental backup system. Incremental backup systems generally create a base backup of a source storage and then create multiple incremental backups of the source storage. An incremental backup generally includes only allocated blocks that were modified since the last backup of the source storage. The source storage can later be restored by applying the backups to a restore storage. Specifically, the base backup is first applied to the restore storage and then each successive incremental backup is applied to the restore storage. The structure of the base backup and incremental backups in incremental backup systems conveniently allows for a staged restore, where the base backup and one or more incremental backups are restored to a restore storage in advance of any need for the restore storage. Then, when the restore storage becomes needed, because the source storage becomes unavailable, for example, the final incremental backups can be restored quickly, and the restore storage will be available relatively quickly with a relatively short downtime between the source storage becoming unavailable and the restore storage becoming available.

Another type of image backup system is a decremental backup system, also known as reverse incremental backup system. Decremental backup systems initially create a base backup to capture the state of a source storage at an initial point in time, then update the base backup to capture the state of the source storage at a subsequent point in time by modifying only those blocks in the base backup that were modified between the initial and subsequent points in time. Prior to the updating of the base backup, however, any original blocks in the base backup that correspond to the modified blocks are copied to a decremental backup, thus enabling restoration of the source storage at the initial point in time (by restoring the updated base backup and then restoring the decremental backup) or at the subsequent point in time (by simply restoring the updated base backup). Since restoring a single base backup is generally faster than restoring a base backup and one or more incremental backups, employing a decremental backup system instead of an incremental backup system may enable the most recent backup to be restored more quickly since the most recent backup is always a base backup instead of potentially being an incremental backup.

One common problem that is encountered with decremental backup systems, however, is that the structure of the base backup and decremental backups in decremental backup systems do not conveniently allow for a staged restore of the backups. In particular, unlike incremental backup systems in which incremental backups created subsequent to the staged restore of a base backup or an incremental backup can simply be applied to the restore storage, decremental backups created subsequent to the staged restore of a base backup or a decremental backup in decremental backup systems cannot simply be applied to the restore storage. Therefore, when a restore storage becomes needed, because the source storage becomes unavailable, for example, decremental backup systems may exhibit a relatively long downtime of the restore storage compared to incremental backup systems that include a staged restore capability.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to a staged restore of a decremental backup chain. The example methods disclosed herein allow blocks from one or more backups of a source storage in a decremental backup chain to be restored in stages and in advance of any need for the restore storage. Then, when the restore storage becomes needed, because the source storage becomes unavailable, for example, the final blocks from the one or more backups in the decremental backup chain that have not yet been restored can be restored quickly, thus enabling the restore storage to be available relatively quickly with a relatively short downtime between the source storage becoming unavailable and the restore storage becoming available.

In one example embodiment, a method for staged restore of a decremental backup chain includes, first, restoring a first backup of a source storage to a restore storage, where the first backup represents allocated blocks from the source storage from a first point in time. Next, a second backup of the source storage in a decremental backup chain of the source storage is identified, where the second backup is a decremental backup and also represents the allocated blocks from the source storage from the first point in time. Then, a third backup of the source storage in the decremental backup chain of the source storage is identified. The third backup is subsequent to the second backup, the second decremental backup depends on the third backup, and the third backup represents allocated blocks from the source storage from a second point in time. Next, blocks in the decremental backup chain that were newly allocated in the source storage between the first point in time and the second point in time are identified. Then, the newly-allocated blocks are restored to the restore storage. Next, blocks in the decremental backup chain that were changed in the source storage between the first point in time and the second point in time are identified. Lastly, the changed blocks are restored to the restore storage.

In another example embodiment, a method for staged restore of a decremental backup chain includes, first, restoring a first backup of a source storage to a restore storage, where the first backup represents allocated blocks from the source storage from a first point in time. Next, a second backup of the source storage in a decremental backup chain of the source storage is identified, where the second backup is a decremental backup and also represents the allocated blocks from the first point in time. Then, a third backup of the source storage in the decremental backup chain of the source storage is identified. The third backup is subsequent to the second backup, the second decremental backup depends on the third backup, and the third backup represents allocated blocks from the source storage from a second point in time. Next, blocks in the decremental backup chain that were newly allocated in the source storage between the first point in time and the second point in time are identified using a file system block allocation map (FSBAM) associated with the second backup and an FSBAM associated with the third backup to identify positions of the newly-allocated blocks. Then, the newly-allocated blocks are restored to the restore storage. Next, blocks in the decremental backup chain that were changed in the source storage between the first point in time and the second point in time are identified using positions of blocks in the second decremental backup to identify positions of the changed blocks. Lastly, the changed blocks are restored to the restore storage.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which:

FIGS. 2A and 2B are schematic block diagrams illustrating an example source storage and an example decremental backup chain;

DESCRIPTION OF EMBODIMENTS

Figure 1:
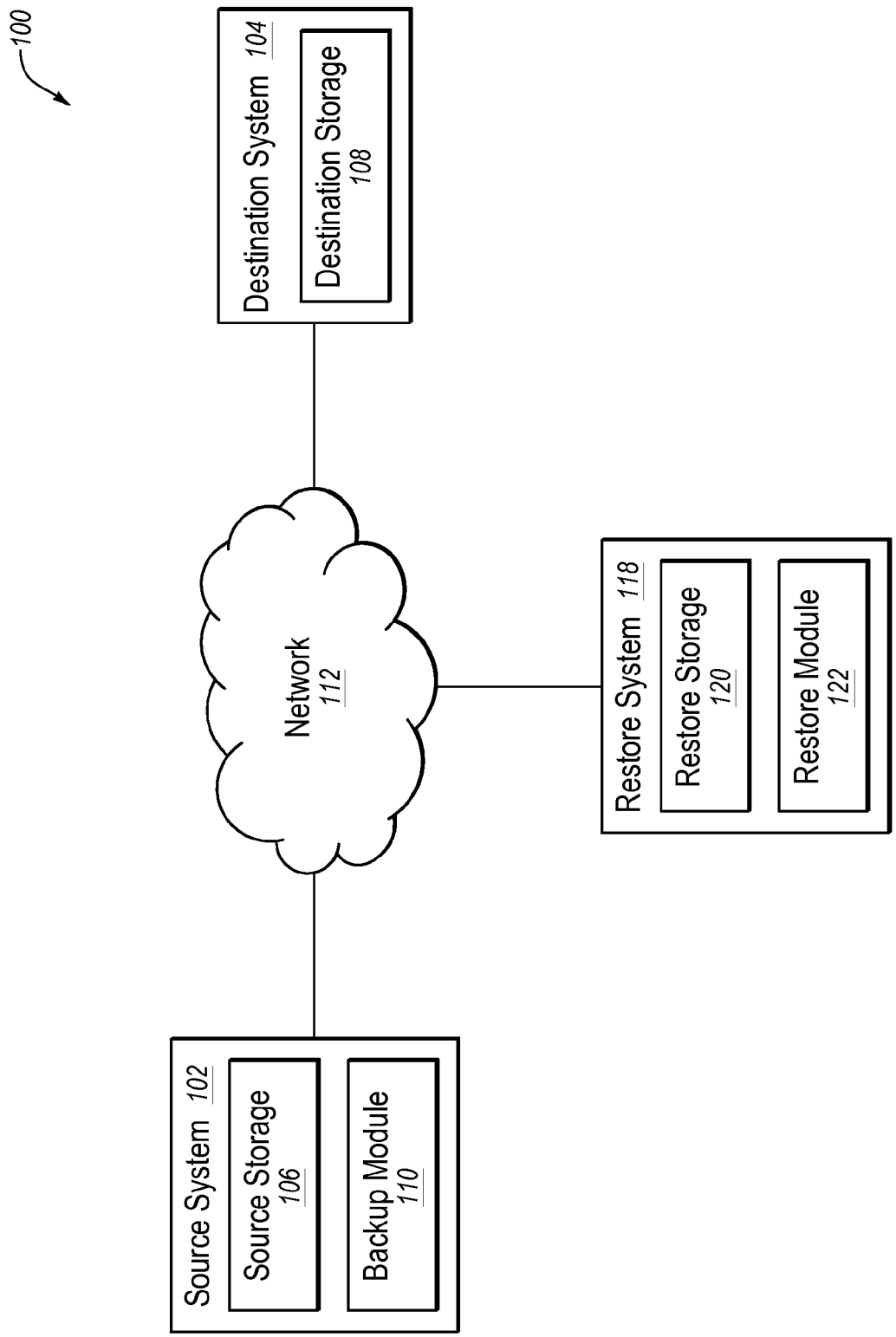
FIG. 1 is a schematic block diagram illustrating an example image backup system.

The term "storage" as used herein refers to computer-readable media, or some logical portion thereof such as a volume, capable of storing data in blocks. The term "block" as used herein refers to a fixed-length discrete sequence of bits. In some example embodiments, the size of each block may be configured to match the standard sector size of a file system of a storage on which the block is stored. For example, the size of each block may be 512 bytes (4096 bits) where 512 bytes is the size of a standard sector. The term "allocated block" as used herein refers to a block in a storage that is currently tracked as storing data by a file system of the storage. The term "free block" as used herein refers to a block in a storage that is not currently employed nor tracked as storing data by a file system of the storage. The term "backup" when used herein as a noun refers to a copy or copies of one or more blocks from a storage. The term "base backup" as used herein refers to a base backup of a storage that includes at least a copy of each unique allocated block of the storage at a point in time such that the base backup can be restored on its own to recreate the state of the storage at the point in time, without being dependent on any other backup. A "base backup" may also include nonunique allocated blocks and free blocks of the storage at the point in time. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial base backup of the storage, can be restored together to recreate the exact state of the storage at the subsequent point in time. The term "modified block" as used herein refers to a block that was modified either because the block was previously-allocated and changed or because the block was modified by being newly-allocated. An "incremental backup" may also include nonunique allocated blocks and free blocks of the storage that were modified between the previous point in time and the subsequent point in time. The term "decremental backup" as used herein refers to an at least partial backup of a storage that includes at least a copy of each unique allocated block from a base backup of the storage that corresponds to a block that was modified in the source storage between a previous point in time and a subsequent point in time, such that the decremental backup, along with all subsequent decremental backups of the storage, including a base backup of the storage, can be restored together to recreate the exact state of the storage at the previous point in time. A "decremental backup" may also include nonunique allocated blocks and free blocks from a base backup of the storage that correspond to blocks that were modified in the source storage between the point in time and the subsequent point in time. A "base backup," an "incremental backup," and/or a "decremental backup" may exclude certain undesired allocated blocks such as blocks of data belonging to files whose contents are not necessary for restoration purposes, such as virtual memory pagination files and machine hibernation state files.

FIG. 1 is a schematic block diagram illustrating an example image backup system 100. As disclosed in FIG. 1, the example image backup system 100 includes a source system 102, a destination system 104, and a restore system 118. The source system 102 includes a source storage 106, the destination system 104 includes a destination storage 108, and the restore system 118 includes a restore storage 120. The source system 102 also includes a backup module 110. The restore system 118 further includes a restore module 122. The systems 102, 104, and 118 are able to communicate with one another over a network 112.

Each of the source system 102, the destination system 104, and the restore system 118 may be any computing device capable of supporting a storage, including a virtual storage such as a virtual volume, and communicating with other systems including, for example, a file server, a web server, a personal computer, a desktop computer, a laptop computer, a handheld device, a multiprocessor system, a microprocessor-based or programmable consumer electronic device, a smartphone, a digital camera, a hard disk drive, a flash memory drive, a virtual machine, or some combination thereof. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

In one example embodiment, the source system 102 may be a first desktop computer, the destination system 104 may be a file server, the restore system 118 may be a second desktop computer, and the network 112 may include the internet. In this example embodiment, the first desktop computer may be configured to periodically back up its storage over the internet as part of a backup job by creating a base backup, one or more decremental backups, and zero or more incremental backups and storing these backups in the storage of the file server. The first desktop computer may also be configured to track modifications to its storage between backups in order to easily and quickly identify, during the creation of a decremental backup or an incremental backup, only those blocks that were modified. The file server may be configured to restore one or more of the backups to the storage of the second desktop computer over the internet if the first desktop computer experiences corruption of its storage or a user simply desires to restore the storage of the first desktop computer to an earlier point in time. This restoration of one or more of the backups may be performed as a staged restore, as discussed in greater detail below.

The image backups stored in the destination storage 108 may be created by the backup module 110. For example, the backup module 110 may be configured to execute computer instructions to perform image backup operations of creating a base backup and multiple decremental and/or incremental backups of the source storage 106. These image backups may initially be created on the source system 102 and then copied to the destination system 104.

The restore module 122 may be configured to restore one or more backups of the source storage 106 to the restore storage 120. For example, the restore module 122 may be configured to execute computer instructions to perform restoration operations of restoring a base backup and one or more decremental and/or incremental backups of the source storage 106, that are stored in the destination storage 108, to the restore storage 120. These restoration operations may include staged restore operations, as discussed in greater detail below.

Although only a single storage is disclosed in each of the systems 102, 104, and 118 in FIG. 1, it is understood that any of the systems 102, 104, and 118 may instead include two or more storages. Also, although the storages 106, 108, and 120 are disclosed as separate storages, it is understood that the storages 106, 108, and 120 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a restore system. Further, although only a single source storage 106 and a single restore storage 120 are disclosed in the example image backup system 100 of FIG. 1, it is understood that the destination system 104 of FIG. 1 is configured to simultaneously back up or restore multiple source storages. Further, although the backup module 110 and the restore module 122 are the only modules disclosed in the example image backup system 100 of FIG. 1, it is understood that the functionality of the backup module 110 and the restore module 122 may be replaced or augmented by one or more similar modules residing on any of the systems 102, 104, and 118 or another system. Further, although the systems 102, 104, and 118 are disclosed in FIG. 1 as communicating over the network 112, it is understood that the systems 102, 104, and 118 may instead communicate directly with each other. For example, in some embodiments two or more of the systems 102, 104, and 118 may be combined into a single system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
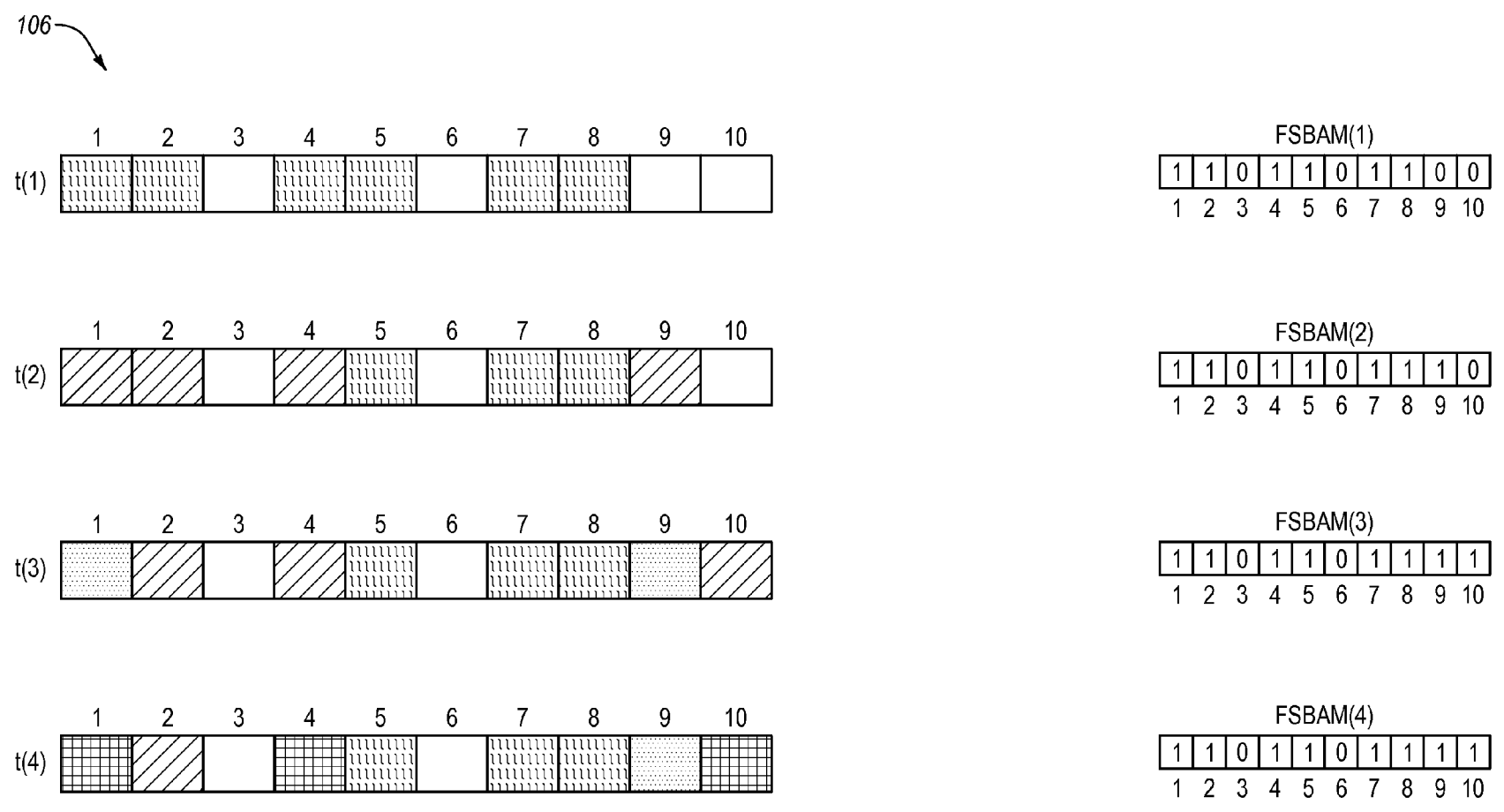
Figure 2B:
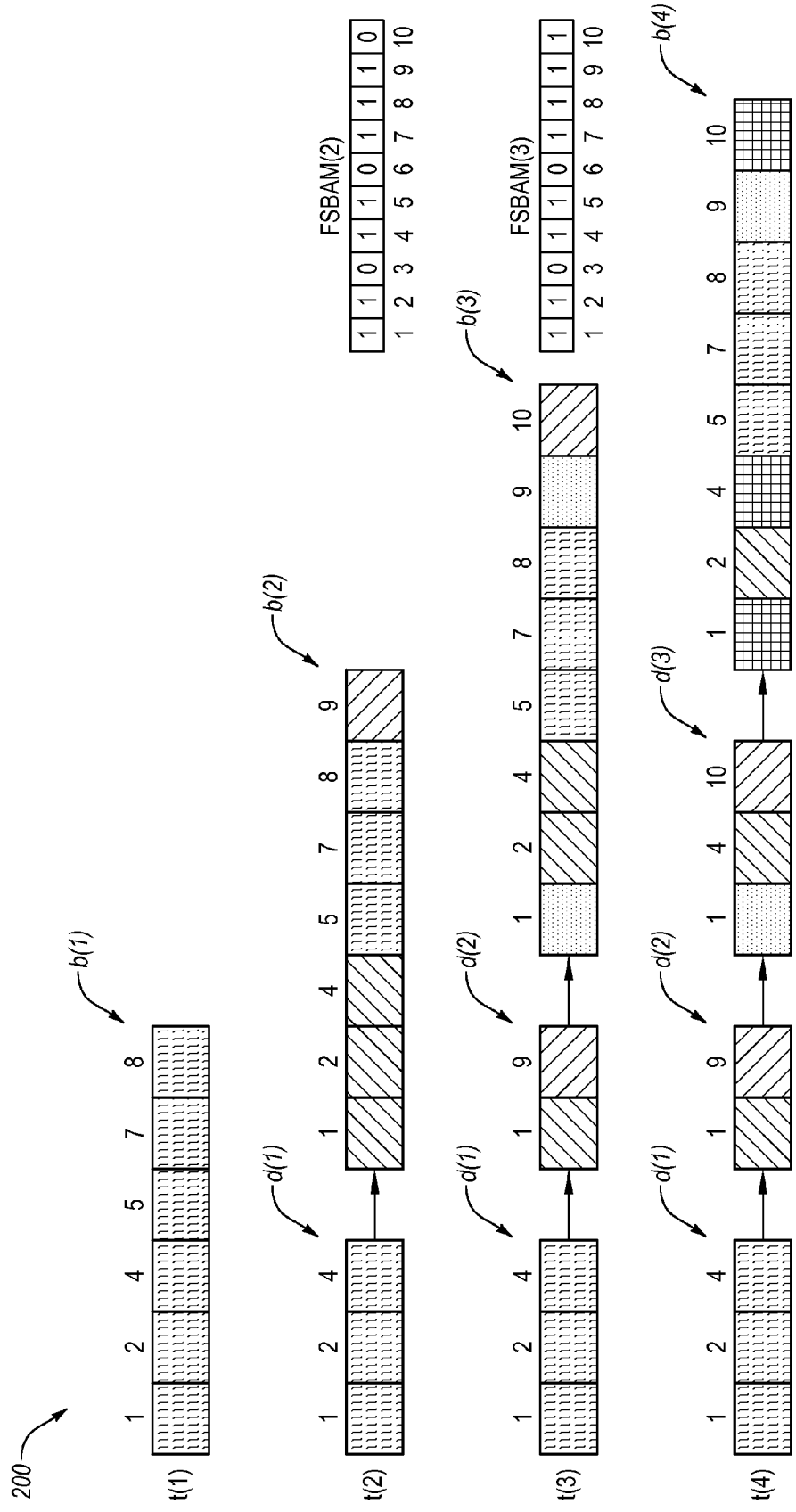

FIGS. 2A and 2B are schematic block diagrams illustrating the example source storage 106 and an example decremental backup chain 200. In particular, FIG. 2A discloses the states of the source storage 106 at times t(1), t(2), t(3), and t(4) and FIG. 2B discloses the decremental backup chain 200 representing the states of the source storage 106 at times t(1), t(2), t(3), and t(4). As disclosed in FIGS. 2A, 2B, and 3, blocks that are allocated are illustrated with a hatch pattern, and blocks that are free are illustrated as blank.

FIGS. 2A and 2B also illustrate file system block allocation maps (FSBAMs) that represent the allocated and free blocks of the source storage 106 at times t(1), t(2), t(3), and t(4), namely, FSBAM(1), FSBAM(2), FSBAM(3), and FSBAM (4), respectively. As disclosed in FIG. 2A, allocated blocks in the FSBAMs are represented with a 1 bit and free blocks in the FSBAMs are represented with a 0 bit. For example, the FSBAM(2) has allocated blocks in positions 1, 2, 4, 5, 7, 8, and 9 and the FSBAM(3) has allocated blocks in positions 1, 2, 4, 5, 7, 8, 9, and 10. Although the FSBAMs are disclosed in FIG. 2A as including a 1 bit or 0 bit for each block position, it is understood that the FSBAMs may instead be implemented using other data structures that do not necessarily include a bit for each block position, such as a run-length encoded list. FSBAMs, such as the FSBAM(2) and FSBAM (3), may be employed during a staged restore of the decremental backup chain 200, as discussed in greater detail below.

As disclosed in FIGS. 2A and 2B, the example decremental backup chain 200 includes base backups b(1), b(2), b(3), and b(4), which represent the states of the source storage 106 at times t(1), t(2), t(3), and t(4), respectively. In addition, the decremental backup chain 200 includes decremental backups d(1), d(2), and d(3), which represent the states of the source storage 106 at times t(1), t(2), and t(3), respectively. In one example embodiment, the backup module 110 creates the base backups b(1), b(2), b(3), and b(4) and the decremental backups d(1), d(2), and d(3) of the source storage 106 and stores them in the destination storage 108.

The base backup b(1) may be created to preserve the state of the source storage 106 at time t(1). The creation of the base backup b(1) may include the backup module 110 copying all allocated blocks of the source storage 106 as allocated at time t(1) and storing the allocated blocks in the destination storage 108. In this example, only blocks in positions 1, 2, 4, 5, 7, and 8 are allocated in the source storage 106 at time t(1), as blocks at positions 3 and 6 are not allocated at time t(1). The state of the source storage 106 at time t(1) may be captured using snapshot technology in order to capture the data stored in the source storage 106 at time t(1) without interrupting other processes, thus avoiding downtime of the source storage 106. The base backup b(1) may be very large depending on the size of the source storage 106 and the number of allocated blocks at time t(1). As a result, the base backup b(1) may take a relatively long time to create and consume a relatively large amount of space in the destination storage 108. It is noted that the base backup b(1) may have a randomly-writeable format in order to allow the base backup b(1) to have new blocks inserted into the base backup at various positions.

Next, the decremental backup d(1) may be created to preserve the state of the source storage 106 at time t(1) while the base backup b(1) is updated to capture the state of the source storage 106 at time t(2), resulting in the updated base backup b(2). This may be accomplished by the backup module 110 identifying allocated blocks in the source storage 106 that changed between time t(1) and time t(2), as well as newly-allocated blocks that were allocated in the source storage 106 between time t(1) and time t(2). In this example, the blocks at positions 1, 2, and 4 in the source storage 106 were changed, and the block at position 9 in the source storage 106 was newly allocated. The backup module 110 may then identify original blocks in the base backup b(1) with the same positions as the changed allocated blocks in the source storage 106, namely, the blocks at positions 1, 2, and 4 in the base backup b(1), and copy these original blocks at positions 1, 2, and 4 from the base backup b(1) into the decremental backup d(1). The changed allocated blocks and newly-allocated blocks from the source storage 106, namely, the changed allocated blocks from positions 1, 2, and 4 and newly-allocated block from position 9 of the source storage 106, are then copied to the base backup b(1), resulting in the updated base backup b(2). As a result, the decremental backup d(1) represents the state of the source storage 106 at time t(1), and the updated base backup b(2) represents the state of the source storage 106 at time t(2).

Next, the decremental backup d(2) may be created to preserve the state of the source storage 106 at time t(2) while the updated base backup b(2) is again updated to capture the state of the source storage 106 at time t(3), resulting in the updated base backup b(3). This may be accomplished by the backup module 110 identifying allocated blocks in the source storage 106 that changed between time t(2) and time t(3), as well as newly-allocated blocks that were allocated in the source storage 106 between time t(2) and time t(3). In this example, the blocks at positions 1 and 9 in the source storage 106 were changed, and the block at position 10 in the source storage 106 was newly allocated. The backup module 110 may then identify original blocks in the base backup b(2) with the same positions as the changed allocated blocks in the source storage 106, namely, the blocks at positions 1 and 9, and copy these original blocks at positions 1 and 9 from the updated base backup b(2) into the decremental backup d(2). The changed allocated blocks and newly-allocated blocks from the source storage 106, namely, the changed allocated blocks from positions 1 and 9 and the newly-allocated block from position 10 of the source storage 106, are then copied to the updated base backup b(2), resulting in the updated base backup b(3). As a result, the decremental backup d(1) represents the state of the source storage 106 at time t(1), the decremental backup d(2) represents the state of the source storage 106 at time t(2), and the updated base backup b(3) represents the state of the source storage 106 at time t(3).

Next, the decremental backup d(3) may be created to preserve the state of the source storage 106 at time t(3) while the updated base backup b(3) is again updated to capture the state of the source storage 106 at time t(4), resulting in the updated base backup b(4). This may be accomplished by the backup module 110 identifying allocated blocks in the source storage 106 that changed between time t(3) and time t(4), as well as newly-allocated blocks that were allocated in the source storage 106 between time t(3) and time t(4). In this example, the blocks at positions 1, 4, and 10 in the source storage 106 were changed, and no blocks were newly allocated. The backup module 110 may then identify original blocks in the base backup b(3) with the same positions as the changed allocated blocks in the source storage 106, namely, the blocks at positions 1, 4, and 10, and copy these original blocks at positions 1, 4, and 10 from the updated base backup b(3) into the decremental backup d(4). The changed allocated blocks from the source storage 106, namely, the changed allocated blocks from positions 1, 4, and 10 of the source storage 106, are then copied to the updated base backup b(3), resulting in the updated base backup b(4). As a result, the decremental backup d(1) represents the state of the source storage 106 at time t(1), the decremental backup d(2) represents the state of the source storage 106 at time t(2), the decremental backup d(3) represents the state of the source storage 106 at time t(3), and the updated base backup b(4) represents the state of the source storage 106 at time t(4).

Therefore, decremental backups may be created on an ongoing basis. The frequency of creating new decremental backups may be altered as desired in order to adjust the amount of data that will be lost should the source storage 106 experience corruption of its stored data or become unavailable at any given point in time. The data from the source storage 106 can be restored to the state at the point in time of a particular decremental backup by applying the image backups to the restore storage 120 from newest to oldest, namely, first applying the base backup and then applying each successive decremental backup up to the particular decremental backup. For example, the data from the source storage 106 can be restored to the state at time t(1), after time t(2), by applying the base backup b(2) and then applying the decremental backup d(1). Similarly, the data from the source storage 106 can be restored to the state at time t(1), after time t(4), by applying the base backup b(4), then applying the decremental backup d(3) and the decremental backup d(2), and finally applying the decremental backup d(1). Alternatively, the data from the source storage 106 can be restored to the state at the point in time of a particular decremental backup by applying the image backups to the restore storage 120 concurrently, namely, concurrently applying the base backup and each successive decremental backup up to the particular decremental backup. For example, the data from the source storage 106 may be restored to the state at time t(1), after time t(4), by accessing the base backup b(4), the decremental backup d(3), the decremental backup d(2), and the decremental backup d(1) concurrently, and retrieving from each backup the correct block content corresponding to time t(1). Advantageously, the most recent backup state of the source storage 106 can be restored at any stage of the decremental backup chain 200 by simply applying the base backup of the decremental backup chain 200.

Since the FSBAM(1)-FSBAM(4) represent states of the source storage 106 at times t(1)-t(4), respectively, each of FSBAM(1)-FSBAM(4) may be associated with all backups in the decremental backup chain 200 that correspond to the point in time represented by the FSBAM. For example, since the FSBAM(2) and the backups b(2) and d(2) all represent states of the source storage 106 at time t(2), the FSBAM(2) may be associated with the backups b(2) and d(2), as illustrated in FIG. 2B. Similarly, since the FSBAM(3) and the backups b(3) and d(3) all represent states of the source storage 106 at time t(3), the FSBAM(3) may be associated with the backups b(3) and d(3), as illustrated in FIG. 2B. In some embodiments, an FSBAM associated with a decremental backup in a decremental backup chain may be reconstructed by searching forward in the decremental backup chain, beginning with the decremental backup, for the first block for each of one or more block positions that make up the FSBAM in order to reconstruct the FSBAM. Similarly, an FSBAM associated with a base backup in a decremental backup chain may be accessed by accessing one or more blocks in the base backup that make up the FSBAM. In other embodiments, a complete copy of the FSBAM may be associated with a decremental backup or a base backup in a decremental backup chain.

Although only allocated blocks are included in the example decremental backup chain 200 discussed above, it is understood that in alternative implementations both allocated and free blocks may be backed up during the creation of a base backup or a decremental backup. This is typically done for forensic purposes, because the contents of free blocks can be interesting where the free blocks contain data from a previous point in time when the blocks were in use and allocated. Therefore, the creation and restoration of base backups and decremental backups as disclosed herein is not limited to allocated blocks but may also include free blocks.

Figure 3:
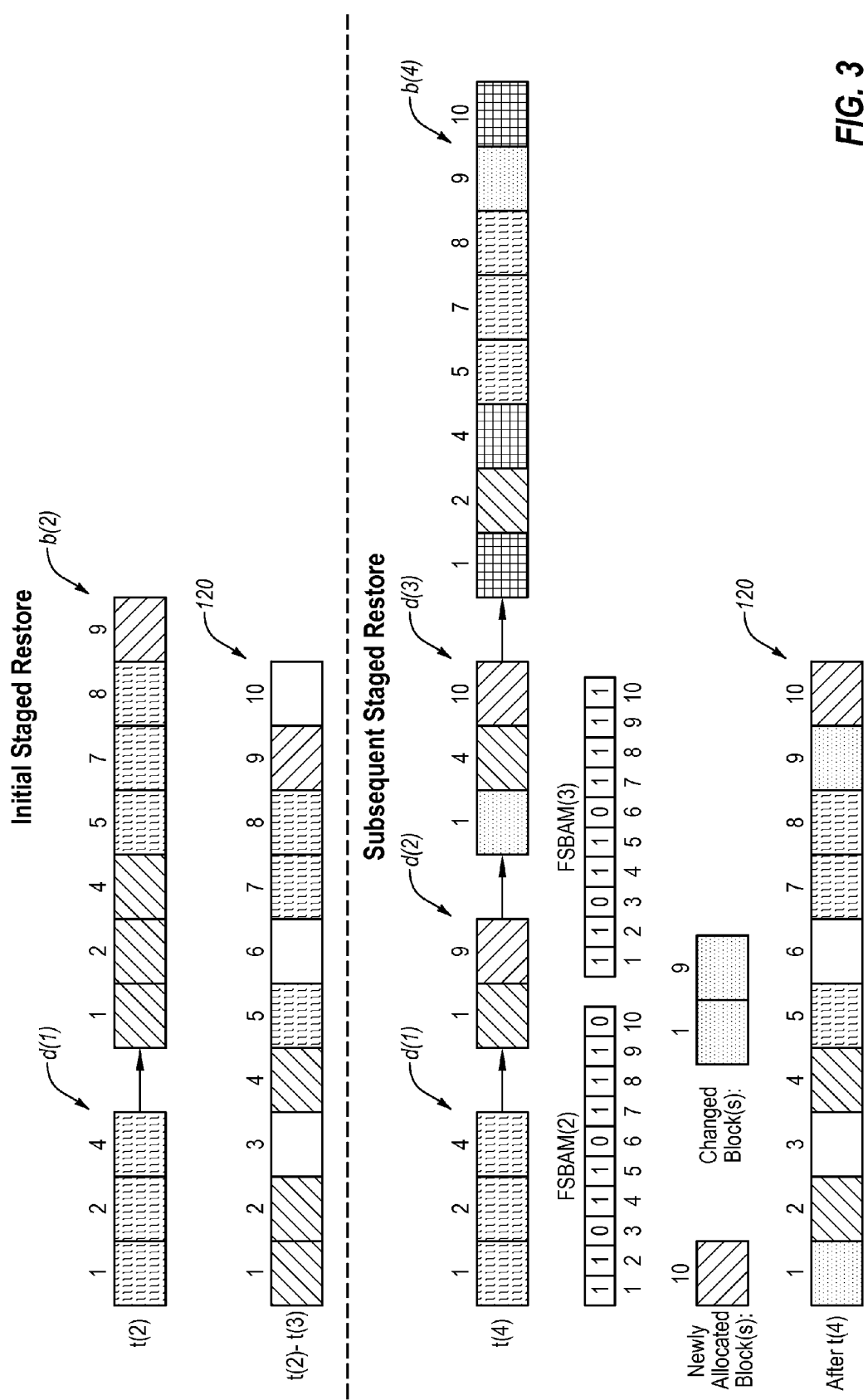
FIG. 3 is a schematic block diagram illustrating an example staged restore of a decremental backup chain to a restore storage.

FIG. 3 is a schematic block diagram illustrating an example staged restore of the decremental backup chain 200 to the restore storage 120. As disclosed in FIG. 3, during an initial staged restore that is performed between time t(2) and time t(3), the base backup b(2) may be restored to the restore storage 120. This restore of the base backup b(2) to the restore storage 120 may include copying the allocated blocks from the base backup b(2) to the restore storage 120. It is noted that after the restoration, the blocks at positions 1, 2, 4, 5, 7, 8, and 9 in the restore storage 120 are allocated and the blocks at positions 3, 6, and 10 in the restore storage 120 are free.

Next, during a subsequent staged restore that is performed after time t(4), a staged restore of the state of the source storage 106 at time t(3) may be performed using the decremental backup chain 200 of FIG. 2. In particular, between the performance of the initial staged restore and time t(4), the decremental backups d(2) and d(3) were created and the base backup b(2) was updated to become base backup b(4) in the decremental backup chain 200 of FIG. 2. Since the modifications to the source storage 106 between time t(2) and time t(3) are not necessarily stored in a single backup corresponding to time t(3) in the decremental backup chain 200 of FIG. 2, the example methods disclosed herein enable the restore storage 120 to be updated to represent the state of the source storage 106 at time t(3) by identifying blocks in the decremental backup chain 200 that were modified and restoring those changed blocks to the restore storage 120.

In particular, after time t(4), the decremental backup d(2) may be identified as representing the allocated blocks from the source storage 106 from the time t(2), which is the same point in time represented by the base backup b(2) that was already restored to the restore storage 120 during the initial staged restore. Further, the decremental backup d(3) may be identified as being subsequent to the decremental backup d(2), being the backup upon which the decremental backup d(2) depends, and representing allocated blocks from the source storage 106 from the time t(3).

Next, the blocks in the decremental backup chain 200 that were newly allocated in the source storage 106 between time t(2) and time t(3) are identified. In the example of FIG. 3, the block in position 10 of the decremental d(3) is identified as having been newly allocated in the source storage 106 between time t(2) and time t(3). Then, the blocks in the decremental backup chain 200 that were changed in the source storage 106 between time t(2) and time t(3) are identified. In the example of FIG. 3, the block in position 1 of the decremental d(3) and the block in position 9 of the base backup b(4) are identified as having changed in the source storage between time t(2) and time t(3). Finally, the newly-allocated block and the changed blocks are restored to the restore storage 120, as disclosed in FIG. 3. It is noted that after the restoration, the blocks at positions 1, 2, 4, 5, 7, 8, 9, and 10 in the restore storage 120 are allocated and the blocks at positions 3 and 6 in the restore storage 120 are free.

The example staged restore of the decremental backup chain 200 to the restore storage 120 of FIG. 3 allows blocks from one or more backups in the decremental backup chain 200 to be restored in stages and in advance of any need for the restore storage 120. Then, when the restore storage 120 becomes needed, because the source storage 106 becomes unavailable, for example, the final blocks from the one or more backups in the decremental backup chain 200 that have not yet been restored can be restored quickly, thus enabling the restore storage 120 to be available relatively quickly with a relatively short downtime between the source storage 106 becoming unavailable and the restore storage 120 becoming available.

Figure 4:
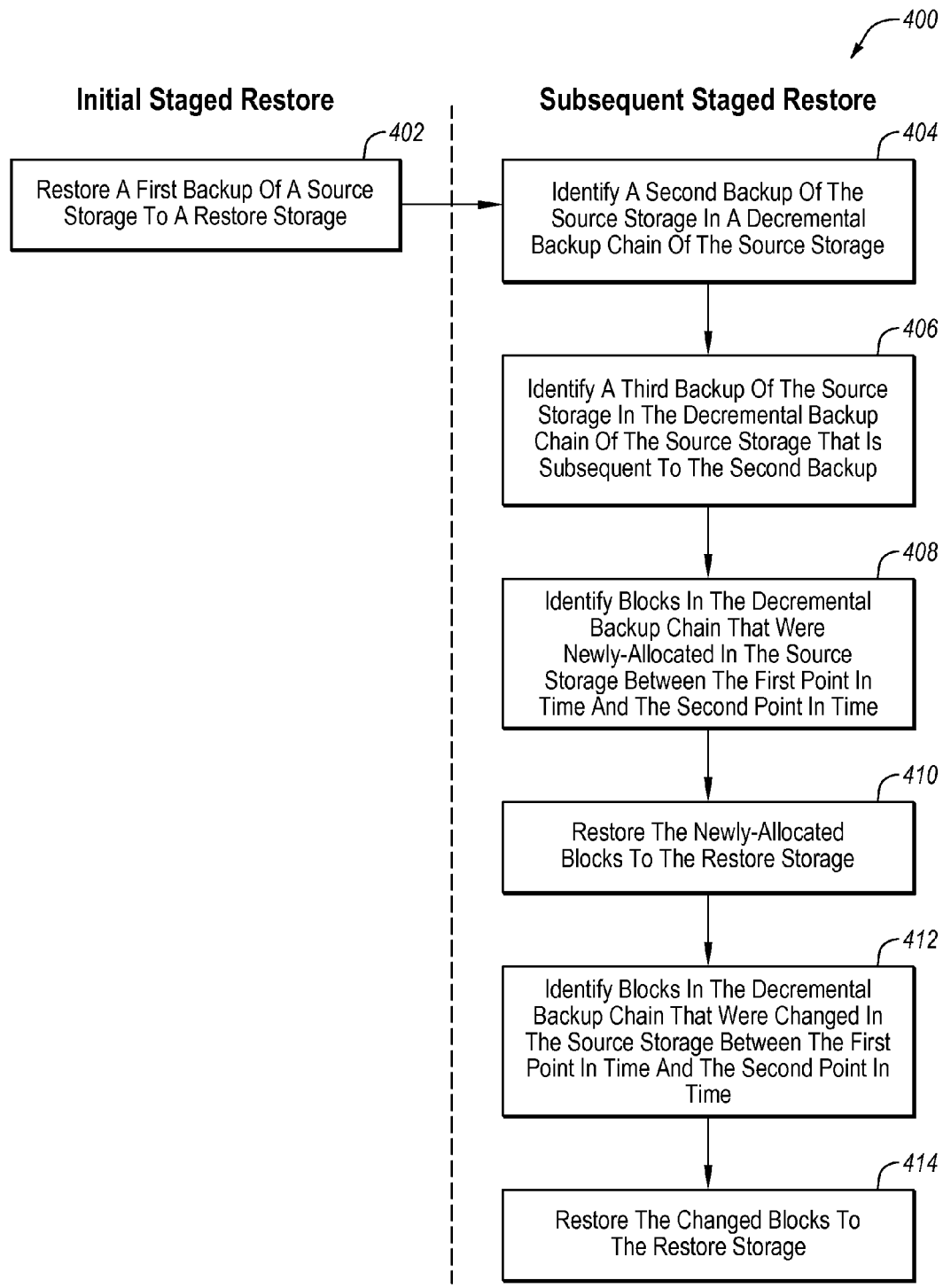
FIG. 4 is a schematic flowchart diagram of an example method for staged restore of a decremental backup chain.

FIG. 4 is a schematic flowchart diagram of an example method 400 for staged restore of a decremental backup chain.

The method 400 may be implemented, in at least some embodiments, by the restore module 122 of the restore system 118 of FIG. 1. For example, the restore module 122 may be configured to execute computer instructions to perform operations of staged restore of a decremental backup chain, as represented by one or more of steps 402-414 of the method 400. The method 400 will now be discussed with reference to FIGS. 1, 3, and 4.

The method 400 may include an initial staged restore and a subsequent staged restore, as disclosed in FIG. 4. The initial staged restore of the method 400 may include step 402 in which a first backup of a source storage is restored to a restore storage, where the first backup represents allocated blocks from the source storage from a first point in time. For example, the restore module 122 of FIG. 1 may restore between time t(2) and time t(3), at step 402, the base backup b(2) to the restore storage 120, as disclosed in FIG. 3. While the base backup b(2) is a base backup in a decremental backup chain, it is understood that the restore at step 402 may be, for example, a decremental backup from a decremental backup chain, may be an incremental backup or base backup from an incremental backup chain, or may be a base backup that is not part of any backup chain. Where the backup restored at step 402 is a decremental backup or an incremental backup, it is understood that the restoration at step 402 may include restoring blocks from other backups in the corresponding backup chain from which the decremental backup or the incremental backup depends directly or indirectly.

The subsequent staged restore of the method 400 may include step 404 in which a second backup of the source storage in a decremental backup chain of the source storage is identified. The second backup may be a decremental backup, and the second backup may also represent the allocated blocks from the source storage from the first point in time. Continuing with the above example, the restore module 122 may identify after time t(4), at step 404, the decremental backup d(2) of the source storage 106 in the decremental backup chain 200 of the source storage 106, as disclosed in FIG. 3. The decremental backup d(2) is identified at step 404 because, like the base backup b(2) that was restored at step 402, it also represents the allocated blocks from the source storage 160 from time t(2).

The subsequent staged restore of the method 400 may include step 406 in which a third backup of the source storage in the decremental backup chain of the source storage is identified. The third backup may be subsequent to the second decremental backup and the second backup may depend on the third backup. Continuing with the above example, the restore module 122 of FIG. 1 may identify, at step 406 performed after time t(4), the decremental backup d(3) of the source storage 106 in the decremental backup chain 200 of the source storage 106, as disclosed in FIG. 3. The decremental backup d(2) is identified at step 406 because it depends directly on the decremental backup d(3), as disclosed in FIG. 3. While the decremental backup d(3) is a decremental backup in the decremental backup chain 200, it is understood that the identification at step 406 may be of a base backup from the decremental backup chain 200.

The subsequent staged restore of the method 400 may include step 408 in which blocks in the decremental backup chain that were newly allocated in the source storage between the first point in time and the second point in time are identified. Continuing with the above example, the restore module 122 of FIG. 1 may identify, at step 408, that the block at position 10 of the decremental backup d(3) in FIG. 3 was newly allocated in the source storage 106 between time t(2) and time t(3).

The identification of the newly-allocated blocks at step 408 may be accomplished using a file system block allocation map (FSBAM) associated with the second backup and an FSBAM associated with the third backup to identify positions of the newly-allocated blocks. In some embodiments, the FSBAM associated with the third backup may be compared to the FSBAM associated with the second backup to identify the positions of the newly-allocated blocks and then the decremental backup chain may be searched forward, beginning with the third backup, for the first block having the position of each of the newly-allocated blocks. Continuing with the above example, the restore module 122 of FIG. 1 may compare, at step 408, the FSBAM(2) associated with the decremental backup d(2) and the FSBAM(3) associated with the decremental backup d(3) to identify position 10 as a position of a newly-allocated block. Then, the decremental backup chain 200 may be searched forward, beginning with the decremental backup d(3), for the first block having position 10, which first block appears in the decremental backup d(3), as disclosed in FIG. 3.

The identification of the newly-allocated blocks at step 408 may be additionally or alternatively be accomplished by accessing a list of newly-allocated blocks that is associated with the third backup.

The creation of this list of newly-allocated blocks may occur during the creation of the second backup and may include comparing the FSBAM corresponding to the first point in time of the second backup and an FSBAM corresponding to the second point in time of the third backup. For example, a list of newly-allocated blocks that lists position 10 may be created and associated with the base backup b(3) at the time that the decremental backup d(2) is created by comparing, during the creation of the decremental backup d(2), the FSBAM(2) that is associated with the decremental backup d(2) to the FSBAM(3) that is associated with the base backup b(3). This comparison may enable a determination that the block at position 10 in the source storage 106 was newly allocated between times t(2) and t(3) and position 10 may then be stored in the list that is associated with the base backup b(3). Later, when the decremental backup d(3) is created, the list may be associated with the decremental backup d(3). Performing this comparison at the time of the creation of the base backup b(3), and saving the result in the list that is initially associated with the base backup b(3) and then later associated with the decremental backup d(3), may avoid performing a similar comparison at step 408, and may enable step 408 to be performed by simply accessing the list associated with the decremental backup d(3).

Additionally or alternatively, the creation of this list of newly-allocated blocks may occur during the creation of the second backup and may include identifying positions of blocks that are copied to the base backup, from which the second backup depends, in which no blocks previously existed in the base backup. For example, a list of newly-allocated blocks that lists position 10 may be created and associated with the base backup b(3) at the time that the decremental backup d(2) is created by identifying, during the updating of the base backup b(2) to capture the state of the source storage 106 at time t(3), that the block copied at position 10 is copied at a position in which no blocks previously existed in the base backup b(2). This identification may enable a determination that the block at position 10 in the source storage 106 was newly allocated between times t(2) and t(3) and position 10 may then be stored in the list that is associated with the base backup b(3). Later, when the decremental backup d(3) is created, the list may be associated with the decremental backup d(3). Performing this identification at the time of the creation of the decremental backup d(2), and saving the result in the list that is initially associated with the base backup b(3) and then later associated with the decremental backup d(3), may enable step 408 to be performed by simply accessing the list associated with the decremental backup d(3).

In addition, after the staged restore advances to the point that the decremental backup d(2) is no longer needed, the existence of the list of newly-allocated blocks that is associated with the decremental backup d(3) may enable the deletion of the decremental backup d(2) since the list will enable a determination of what blocks were newly allocated between time t(2) and time t(3) without the continued existence of the decremental backup d(2).

The subsequent staged restore of the method 400 may include step 410 in which the newly-allocated blocks are restored to the restore storage. Continuing with the above example, the restore module 122 in FIG. 1 may restore, at step 410, the newly-allocated block at position 10 of the decremental backup d(3) to the restore storage 120, as disclosed in FIG. 3. In this example, the newly-allocated block at position 10 of the decremental backup d(3) is restored to the restore storage 120 by copying this block to the restore storage 120, since no allocated blocks previously existed at position 10 in the restore storage 120.

The subsequent staged restore of the method 400 may include a step 412 in which blocks in the decremental backup chain that were changed in the source storage between the first point in time and the second point in time are identified. Continuing with the above example, the restore module 122 of FIG. 1 may identify, at step 412, that the block in position 1 of the decremental d(3) and the block in position 9 of the base backup b(4) in FIG. 3 were changed in the source storage 106 between time t(2) and time t(3).

The identification of the changed blocks at step 412 may be accomplished using positions of blocks in the second backup to identify positions of the changed blocks. In some embodiments, the positions of blocks in the second backup are identified to identify positions of the changed blocks and then the decremental backup chain may be searched forward, beginning with the third backup, for the first block having the position of each of the changed blocks. Continuing with the above example, the restore module 122 of FIG. 1 may identify, at step 412, positions 1 and 9 of the blocks in the decremental backup d(2) to identify positions of the changed blocks. Then, the decremental backup chain 200 may be searched forward, beginning with the decremental backup d(3), for the first block having positions 1 and 9, with the first block with position 1 appearing in the decremental backup d(3), and with the first block with position 9 appearing the base backup b(4), as disclosed in FIG. 3.

The identification of the changed blocks at step 412 may be additionally or alternatively accomplished by accessing a list of changed blocks that is associated with the third backup.

The creation of this list of changed blocks may occur during the creation of the second backup and may include identifying the positions of the blocks in the second backup to identify positions of the changed blocks. For example, a list of changed blocks that lists positions 1 and 9 may be created and associated with the base backup b(3) at the time that the decremental backup d(2) is created by identifying, during the creation of the decremental backup d(2), the positions 1 and 9 of the blocks in the decremental backup d(2) to identify positions 1 and 9 of the changed blocks. This identification may enable a determination that the blocks at positions 1 and 9 in the source storage 106 were changed between times t(2) and t(3) and positions 1 and 9 may then be stored in the list that is associated with the base backup b(3). Later, when the decremental backup d(3) is created, the list may be associated with the decremental backup d(3). Performing this identification at the time of the creation of the decremental backup d(2), and saving the result in the list that is initially associated with the base backup b(3) and then later associated with the decremental backup d(3), may enable step 412 to be performed by simply accessing the list associated with the decremental backup d(3).

Additionally or alternatively, the creation of this list of changed blocks may occur during the creation of the second backup and may include identifying positions of blocks that are copied to the base backup, from which the second backup depends, in which blocks previously existed in the base backup. For example, a list of changed blocks that lists positions 1 and 9 may be created and associated with the base backup b(3) at the time that the decremental backup d(2) is created by identifying, during the updating of the base backup b(2) to capture the state of the source storage 106 at time t(3), that the block copied at positions 1 and 9 are copied at positions in which blocks previously existed in the base backup b(2). This identification may enable a determination that the blocks at positions 1 and 9 in the source storage 106 were changed between times t(2) and t(3) and positions 1 and 9 may then be stored in the list that is associated with the base backup b(3). Later, when the decremental backup d(3) is created, the list may be associated with the decremental backup d(3). Performing this identification at the time of the creation of the decremental backup b(2), and saving the result in the list that is initially associated with the base backup b(3) and then later associated with the decremental backup d(3), may enable step 412 to be performed by simply accessing the list associated with the decremental backup d(3).

In addition, after the staged restore advances to the point that the decremental backup d(2) is no longer needed, the existence of the list of changed blocks that is associated with the decremental backup d(3) may enable the deletion of the decremental backup d(2) since the list will enable a determination of what blocks were changed between time t(2) and time t(3) without the continued existence of the decremental backup d(2).

The subsequent staged restore of the method 400 may include a step 414 in which the changed blocks are restored to the restore storage. Continuing with the above example, the restore module 122 in FIG. 1 may restore, at step 414, the changed blocks at position 1 of the decremental backup d(3) and at position 9 of the base backup b(4) in the restore storage 120. In this example, restoring the changed blocks at position 1 of the decremental backup d(3) and at position 9 of the base backup b(4) to the restore storage 120 includes replacing blocks in the restore storage 120 having the positions 1 and 9 of the changed blocks with the corresponding changed blocks, since allocated blocks previously existed at positions 1 and 9 in the restore storage 120.

It is understood that steps 412 and 414 in the method 400 may be performed prior, concurrently, subsequently, or some combination thereof, to steps 408 and 410 of the method 400.

The example method 400 thus allows blocks from one or more backups in the decremental backup chain 200 to be restored in stages and in advance of any need for the restore storage 120. Then, when the restore storage 120 becomes needed, because the source storage 106 becomes unavailable for example, the final blocks from the one or more backups in the decremental backup chain 200 that have not yet been restored can be restored quickly, thus enabling the restore storage 120 to be available relatively quickly with a relatively short downtime between the source storage 106 becoming unavailable and the restore storage 120 becoming available.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for staged restore of a decremental backup chain, the method comprising:
   restoring a first backup of a source storage to a restore storage, the first backup representing allocated blocks from the source storage from a first point in time;
   identifying a second backup of the source storage in a decremental backup chain of the source storage, the second backup being a decremental backup, the second backup also representing the allocated blocks from the source storage from the first point in time;
   identifying a third backup of the source storage in the decremental backup chain of the source storage that is subsequent to the second backup and upon which the second backup depends, the third backup representing allocated blocks from the source storage from a second point in time;
   identifying blocks in the decremental backup chain that were newly allocated in the source storage between the first point in time and the second point in time;
   restoring the newly-allocated blocks to the restore storage;
   identifying blocks in the decremental backup chain that were changed in the source storage between the first point in time and the second point in time; and
   restoring the changed blocks to the restore storage.

2. The method of claim 1, wherein the first backup is a backup in the decremental backup chain.

3. The method of claim 2, wherein the first backup is a decremental backup in the decremental backup chain.

4. The method of claim 2, wherein the first backup is a base backup in the decremental backup chain.

5. The method of claim 1, wherein the first backup is an incremental backup that is not in the decremental backup chain.

6. The method of claim 1, wherein the first backup is a base backup that is not in the decremental backup chain.

7. The method of claim 1, wherein the third backup is a decremental backup in the decremental backup chain.

8. The method of claim 1, wherein the third backup is a base backup in the decremental backup chain.

9. The method of claim 1, wherein the identifying the blocks in the decremental backup chain that were newly allocated in the source storage between the first point in time and the second point in time includes:
   comparing a file system block allocation map (FSBAM) associated with the third backup to an FSBAM associated with the second backup to identify positions of the newly-allocated blocks; and
   searching forward in the decremental backup chain beginning with the third backup for the first block having the position of each of the newly-allocated blocks.

10. The method of claim 1, wherein the identifying the blocks in the decremental backup chain that were newly allocated in the source storage between the first point in time and the second point in time includes:
    accessing a list of newly-allocated blocks that is associated with the third backup and that was created during creation of the second backup by:
       comparing an FSBAM corresponding to the first point in time to an FSBAM corresponding to the second point in time to identify positions of the newly-allocated blocks; or
       identifying positions of blocks that are copied to a base backup, from which the second backup depends, in which positions no blocks previously existed in the base backup to identify positions of the newly-allocated blocks; and
    searching forward in the decremental backup chain beginning with the third backup for the first block having the position of each of the newly-allocated blocks.

11. The method of claim 1, wherein the identifying blocks in the decremental backup chain that were changed in the source storage between the first point in time and the second point in time includes:
    identifying positions of blocks in the second backup to identify positions of the changed blocks; and
    searching forward in the decremental backup chain beginning with the third backup for the first block having the position of each of the changed blocks.

12. The method of claim 11, wherein the identifying blocks in the decremental backup chain that were changed in the source storage between the first point in time and the second point in time includes:

accessing a list of changed blocks that is associated with the third backup and that was created during creation of the second backup by:
  identifying positions of blocks in the second backup to identify positions of the changed blocks; or
  identifying positions of blocks that are copied to a base backup, from which the second backup depends, in which positions blocks previously existed in the base backup to identify positions of the changed blocks; and
searching forward in the decremental backup chain beginning with the third backup for the first block having the position of each of the changed blocks.

13. One or more non-transitory computer-readable media storing one or more programs that are configured, when executed, to cause one or more processors to perform the method as recited in claim 1.

14. A method for staged restore of a decremental backup chain, the method comprising:
  restoring a first backup of a source storage to a restore storage, the first backup representing allocated blocks from the source storage from a first point in time;
  identifying a second backup of the source storage in a decremental backup chain of the source storage, the second backup being a decremental backup, the second backup also representing the allocated blocks from the source storage from the first point in time;
  identifying a third backup of the source storage in the decremental backup chain of the source storage that is subsequent to the second backup and upon which the second backup depends, the third backup representing allocated blocks from the source storage from a second point in time;
  identifying blocks in the decremental backup chain that were newly allocated in the source storage between the first point in time and the second point in time using a file system block allocation map (FSBAM) associated with the second backup and an FSBAM associated with the third backup to identify positions of the newly-allocated blocks;
  restoring the newly-allocated blocks to the restore storage;
  identifying blocks in the decremental backup chain that were changed in the source storage between the first point in time and the second point in time using positions of blocks in the second backup to identify positions of the changed blocks; and
  restoring the changed blocks to the restore storage.

15. The method of claim 14, wherein the first backup is a base backup in the decremental backup chain that existed prior to the second point in time.

16. The method of claim 14, wherein the identifying the blocks in the decremental backup chain that were newly allocated in the source storage between the first point in time and the second point in time includes:
  comparing the FSBAM associated with the third backup to the FSBAM associated with the second backup to identify the positions of the newly-allocated blocks; and
  searching forward in the decremental backup chain beginning with the third backup for the first block having the position of each of the newly-allocated blocks.

17. The method of claim 16, wherein the restoring the newly-allocated blocks to the restore storage includes copying the newly-allocated blocks to the restore storage.

18. The method of claim 14, wherein the identifying blocks in the decremental backup chain that were changed in the source storage between the first point in time and the second point in time includes searching forward in the decremental backup chain beginning with the third backup for the first block having the position of each of the changed blocks.

19. The method of claim 18, wherein the restoring the changed blocks to the restore storage includes replacing blocks in the restore storage having the positions of the changed blocks with the corresponding changed blocks.

20. One or more non-transitory computer-readable media storing one or more programs that are configured, when executed, to cause one or more processors to perform the method as recited in claim 14.

\* \* \* \* \*